United States Patent [19]
Nelson et al.

[11] 3,814,961
[45] June 4, 1974

[54] TROLLING MOTOR STRUCTURE

[75] Inventors: Isaac Hilton Nelson; Heyward Taylor Spinks, both of Columbus, Miss.

[73] Assignee: Ambac Industries, Incorporated, Columbus, Miss.

[22] Filed: Aug. 2, 1972

[21] Appl. No.: 277,145

[52] U.S. Cl. ................................ 310/87, 115/18
[51] Int. Cl. ............................................ H02k 5/12
[58] Field of Search ......... 310/87, 89, 90, 43, 15 A, 310/54, 58; 115/18 E

[56] References Cited
UNITED STATES PATENTS

| | | | |
|---|---|---|---|
| 2,465,446 | 3/1949 | Gorfin et al. | 310/154 X |
| 2,548,133 | 4/1951 | Treat | 310/87 UX |
| 2,714,866 | 8/1955 | Pleuger et al. | 310/87 UX |
| 2,777,963 | 1/1957 | Kuntz | 310/43 X |
| 2,824,984 | 2/1958 | Harris | 310/87 |
| 3,209,156 | 9/1965 | Struble, Jr. | 310/87 X |
| 3,275,862 | 9/1966 | Krey | 310/87 |
| 3,401,281 | 9/1968 | Martin et al. | 310/43 X |
| 3,593,050 | 7/1971 | Ware | 310/87 |
| 3,708,251 | 1/1973 | Pierro | 115/18 E X |

Primary Examiner—D. F. Duggan
Attorney, Agent, or Firm—Dorfman, Herrell and Skillman

[57] ABSTRACT

A trolling motor for operation immersed in water is provided including a watertight motor housing having a first end section and a second end section of a polymeric material, flux generating means supported by the motor housing, and an armature assembly having a shaft rotatably supported by the motor housing. The trolling motor housing is designed in a manner to sufficiently dissipate heat generated by operation of the motor to the water to prevent deformation of the housing, and the polymeric material of the motor housing is characterized by its thermal stability at normal operating temperatures of the motor when cooled by water in a predetermined manner, its high resistance to deformation and to breakage under impact, and its resistance to deterioration by water during normal use of the motor.

8 Claims, 12 Drawing Figures

PATENTED JUN 4 1974 3,814,961

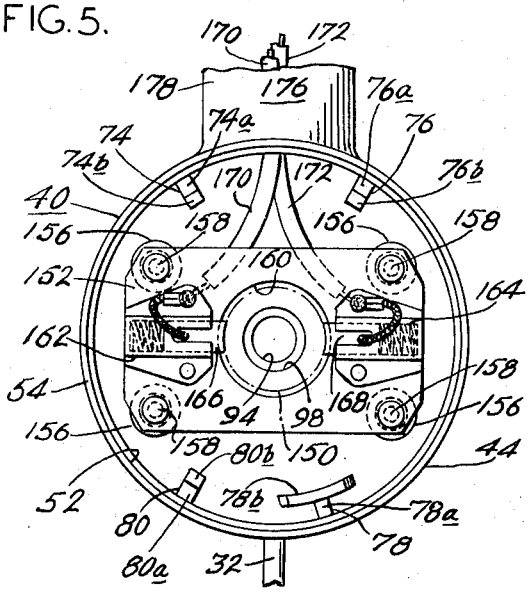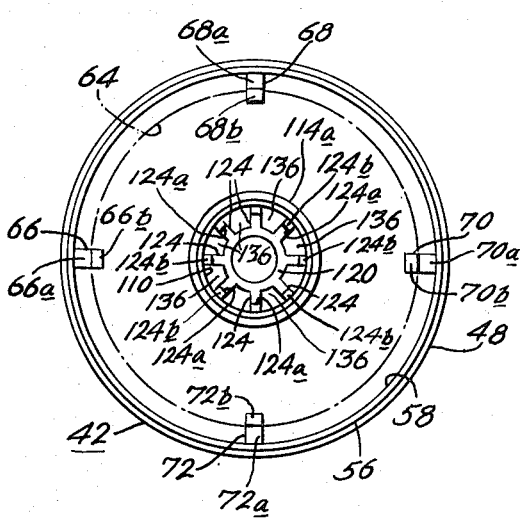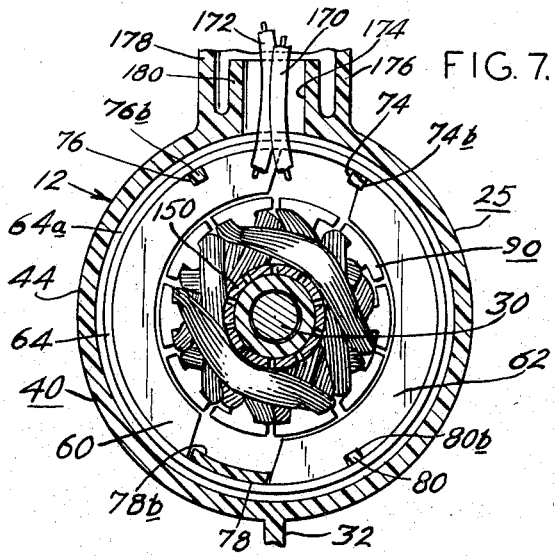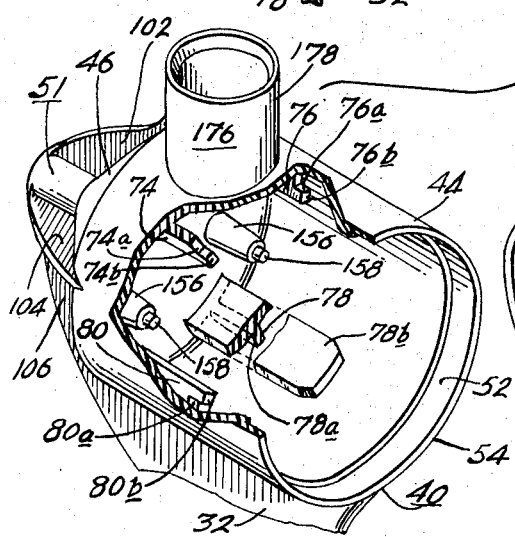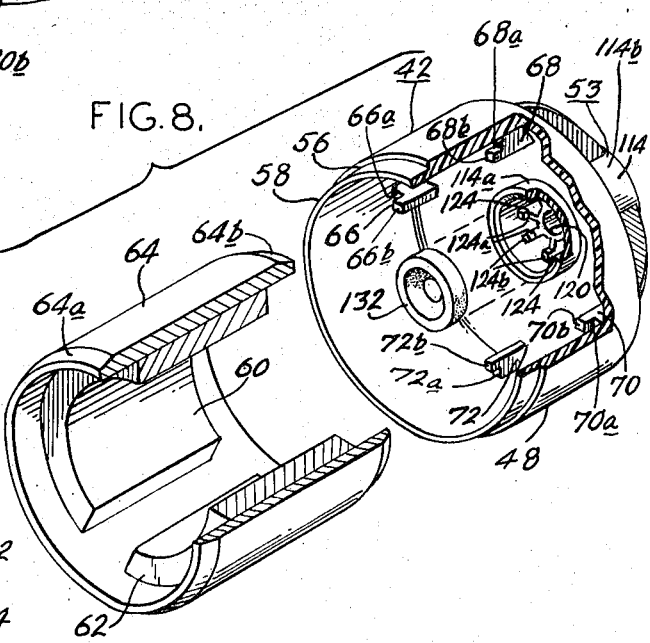

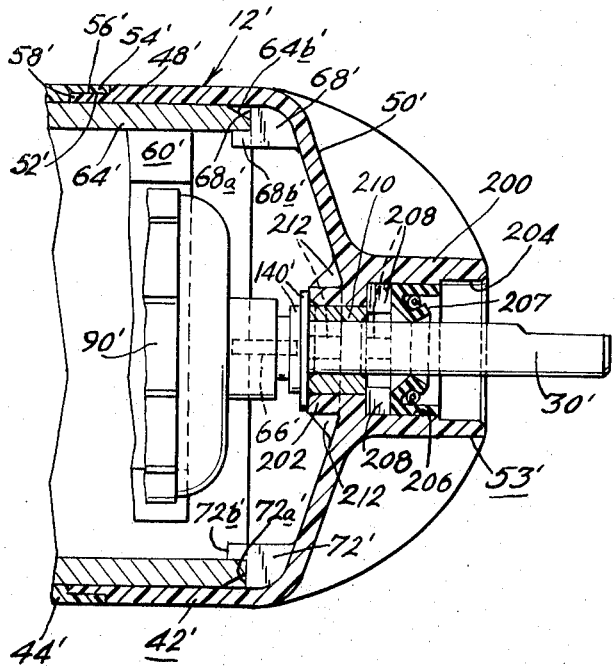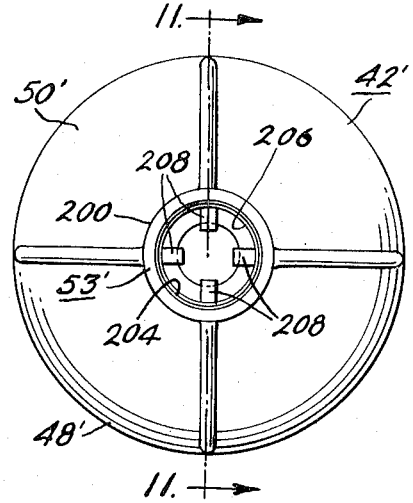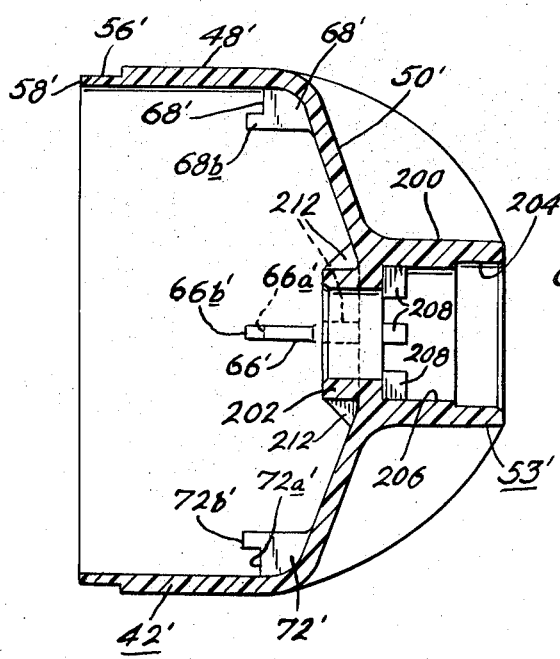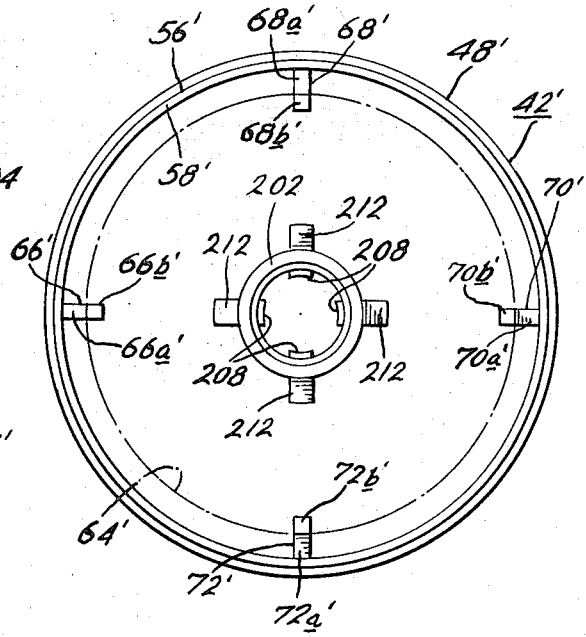

TROLLING MOTOR STRUCTURE

The present invention relates to an electric trolling motor structure adapted for operation immersed in water, and, more specifically, to an improved trolling motor housing of polymeric material that is specially designed for dissipating heat during operation of the motor.

In the prior art, small electric trolling motors have been employed to power small boats, such as small fishing and row boats, at a slow rate of speed, for example, speeds of 1 to 2½ miles per hour. Such trolling motors are adapted to be portable and are coupled to the boat with which they are used by any suitable means which permits the motor to power the boat. These trolling motors with their associated propellers are adapted to be immersed in water during use in powering the boat. Prior art trolling motors have employed housing structures having a relatively large number of parts and have frequently involved elaborate housing arrangements in order to dissipate heat generated by the motor during operation. Furthermore, the repair of trolling motors which become defective usually requires that the motor be taken or sent to an experienced repairman and in most instances it is difficult to obtain fast, economical and effective service. Therefore, it is desirable to eliminate the expense of fabrication and assembly of motor housings having a number of separate parts and to provide a trolling motor which minimizes malfunction. It is also desirable to provide an inexpensive trolling motor with a minimum number of parts so that if a malfunction occurs, the cost of replacing the entire trolling motor approaches the charge for repair, thereby making it more advantageous to replace the entire trolling motor.

In the past, difficulties have been experienced in designing an inexpensive trolling motor housing due to heat dissipation, which is a major problem with motors operating in sealed housings immersed in water. Inexpensive motor housings have been designed employing materials, such as plastic, but the housings have been found to become extremely hot during operation and the heat has caused destruction or deformation of parts of the housing. Hence, manufacturers have continued to make the motor housings of metal in order to be capable of withstanding very hot temperatures. Thus, it is desirable to provide a trolling motor housing which provides good heat transfer characteristics for the motor but is made of an inexpensive material. Furthermore, it is desirable to eliminate the expense of fabrication and assembly of metal housings having a number of separate parts. The present invention in contrast to the prior art employs a highly simplified housing structure of polymeric material with a minimum number of parts in order to provide a highly economical structure.

In accordance with the present invention, these and other objectives are achieved by providing a new and improved trolling motor structure with novel features which cooperate to accomplish the objectives. The present trolling motor, which is adapted for operation immersed in water, comprises a watertight motor housing including a first end section and a second end section of polymeric material. Flux generating means is supported by the motor housing and an armature assembly is provided having a shaft rotatably supported by the motor housing. At least one of the end sections has an end opening for receiving one end of the armature shaft through the opening. According to the invention, the first end section and second end section have axially extending portions of reduced diameter and the ends of the shaft are rotatably supported within the axially extending portions in a manner to control heat generated by rotation of the armature assembly to prevent deformation of the housing. In this arrangement, the polymeric material of the motor housing is characterized by its thermal stability at normal operating temperatures of the motor when cooled by water in a predetermined manner, its resistance to permanent deformation and to breakage under impact, and its resistance to deterioration by water during normal use of the motor.

In one embodiment of the invention, the end section having the opening is the second end section and the axially extending portion of the second end section has a cylindrical opening providing a bearing directly supporting the end of the shaft. The second end section further includes passage means for circulating water between the shaft and the axially extending portion of the second end section to dissipate heat sufficiently to prevent deformation of the second end section. Sealing means is provided encircling the shaft and is supported by the second end section at the inner side of the axially extending portion of the second end section to prevent water from entering into the motor housing through the opening.

According to a preferred embodiment of the invention, the axially extending portion of the second end section is provided by a tubular portion through which the shaft extends, and the axially extending portion of the second end section further includes an annular portion supported in the tubular portion by a plurality of members between the tubular portion and annular portion. The annular portion encircles the shaft and provides a bearing directly supporting the shaft. In this arrangement, the sealing means encircles the shaft and is supported by the tubular portion on the inside of the housing from the annular portion. Also, the passage means for water is provided between the tubular portion and annular portion and between the sealing means and annular portion to circulate water from outside the housing around the annular portion and between the annular portion and the shaft. In this manner, the second end section of polymeric material directly supports the armature shaft without separate bearings or other members to provide an integral and inexpensive end section.

In accordance with a further feature of the invention, the axially extending portion of the first end section projects outwardly from the first end section and has an internal recess opening into the housing. A bearing member is supported in the recess of the axially extending portion, and the bearing member rotatably supports the other end of the shaft. The axially extending portion of the first end section has a reduced diameter to sufficiently dissipate heat from the bearing member to the water to prevent deformation of the first end section during operation of the motor.

The present trolling motor with the motor housing designed in a predetermined manner to facilitate good water circulating around areas in which the ends of the armature shaft are rotatably supported, enables the use of polymeric material to form the motor housing. Furthermore, the trolling motor housing of the present invention has only two sections which may directly support the armature shaft to eliminate separate bearings or may employ a simple bearing arrangement to provide an inexpensive structure to manufacture and assemble.

For a better understanding of these and other features and advantages of the present invention, reference is made to the following description and accompanying drawings, in which:

FIG. 5 is an end elevational view looking into the interior of the front end section of the housing with the armature assembly and flux generating structure removed for clarity and showing parts broken away;

FIG. 6 is an end elevational view looking into the interior of the back end section of the housing with the armature assembly, flux generating structure, and sealing ring around the armature shaft omitted for clarity;

FIG. 7 is a sectional view on a reduced scale taken along line 7—7 of FIG. 2 and showing parts broken away;

FIG. 8 is an exploded perspective view on a reduced scale of the trolling motor of FIG. 2 with the armature assembly and insulating brush board removed and showing parts broken away for clarity;

FIG. 9 is a fragmentary sectional view of the back end section of the trolling motor showing an alternative form of the back end section of the housing shown in FIG. 2;

FIG. 10 is a back end elevational view of the trolling motor housing of FIG. 9 on a reduced scale;

FIG. 11 is a sectional view of the back end section of the trolling motor housing of FIG. 9 with the armature assembly, flux generating structure, bearing member and sealing ring around the armature shaft omitted for clarity; and FIG. 12 is an end elevational view looking into the interior of the back end section of the housing of FIG. 11.

Figure 1:
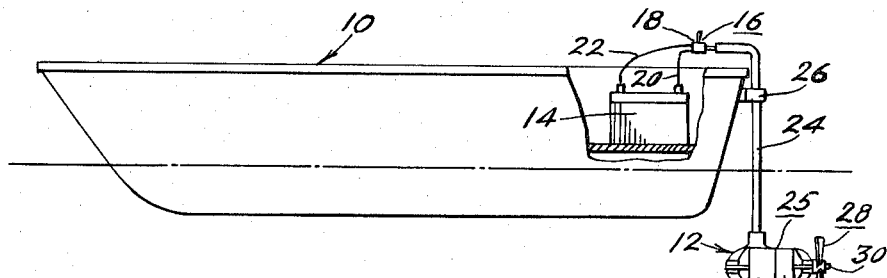
FIG. 1 is a schematic side elevational view of a boat, with parts broken away, provided with a trolling motor in accordance with the present invention.

Referring to the drawings, there is represented in FIG. 1 a boat, generally designated 10, such as a conventional row boat, having a trolling motor, generally designated 12, associated therewith for propelling the boat through the water. There is also illustrated in FIG. 1 a storage battery 14 positioned in the boat and providing a source of direct current voltage for the electric trolling motor 12. Power is supplied to the trolling motor by electrical means generally designated 16, which includes a control switch 18 connected in a circuit with battery 14 by suitable electrical lines 20 and 22. Electrical lines from control switch 18 to the trolling motor pass through watertight conduit means 24, which is provided by a generally L-shaped pipe extending from above the boat to the trolling motor housing, generally designated 25, for being coupled to the motor housing in a watertight seal.

The trolling motor is supported by conduit or pipe 24, which is held to the boat by bracket 26 at the back of the boat. Of course, the trolling motor could be supported by the conduit or pipe 24 from the side or front of the boat, as desired, and any suitable means for holding the conduit or pipe to the boat may be employed. The trolling motor 12 is provided with a propeller, generally designated 28, fixed to armature shaft 30 of the motor for propelling the motor and boat through the water. A fin or rudder 32 is fixed to a bottom surface of the motor housing, and in the present instance fin 32 is made integral with the motor housing, to control the direction of movement of the boat and provide a means for protecting the propeller from objects in the water and from scraping ground. The direction of travel of the boat is controlled by rotating conduit or pipe 24 with respect to its generally vertical axis.

According to the present invention, it has now been found that the motor housing can be made with two end sections of a plastic material, which substantially reduces the cost of the motor housing. In accordance with the present invention, a trolling motor housing, when cooled by water in a predetermined manner, as will be explained more fully hereinafter, can be made of a plastic material. Particularly, certain polymeric materials are well suited to this application due to their thermal stability at normal operating temperatures of the motor when cooled by water in a predetermined manner, their resistance to permanent deformation and to breakage under impact, and their resistance to deterioration in water during normal use of the motor.

The normal temperature in the motor housing when the motor is operating is in the range of about 220°F. to about 250°F. and therefore, the trolling motor housing must withstand such temperatures over the life of operation of the motor. Furthermore, the motor housing during normal use of the motor may be accidentally dropped several feet onto hard surfaces so that the housing must be capable of withstanding impact under such conditions. Hence, the polymeric material employed and suitable for this application should possess various characteristics. For example, it is desirable that the polymeric material used for the motor housing have a continuous resistance to heat at approximately 220°F. minimum without any loss of physical properties or degradation for a period of 5,000 hours. The polymeric material in this application preferably should provide sufficient rigidity under continuous heat at 220°F. As a measure of this rigidity, a heat deflection temperature test at 220°F. under a pressure of 264 psi may be employed, one such test being the ASTM test designated: D 648-56, entiled "Standard Method of Test for Deflection Temperature of Plastic Under Load." The polymeric material employed in the housing should have a resistance to hydrolysis or degradation by water. It is also desirable to have the polymeric material forming the sections of the housing capable of being bonded together by solvent cement or other adhesives, ultrasonic bonding or welding. The specially designed housing of polymeric material preferably has an impact strength of two inch pounds per inch squared at 70°F. or a greater temperature, one recognized test for such impact strength being the ASTM test designated: D 256-70, entitled "Standard Method of Test for Impact Resistance of Plastics and Electrical Insulating Materials." The housing of polymeric material preferably has a tensile strength on the order of 6,000 pounds per square inch at 70°F.

A polymeric material suitable for the trolling motor housing is sold under the trade name "LEXAN," which is a thermoplastic polycarbonate material, by the General Electric Company. This material has been found particularly advantageous due not only to its ability to withstanding normal operating temperatures encountered in the motor housing but also because of the fact that it has a high resistance to deformation and breakage under impact and a high resistance to deterioration in water. Another polymeric material suitable for use is sold under the name "ABS," which is a polyacrylonitrile-butadiene-styrene material, by the Marbon Division of Borg Warner Corporation. Still another polymeric material suitable for use for a motor housing in accordance with the invention is an alloy of "ABS", sold under the name "Cycoloy 800", by the Marbon Division of Borg Warner Corporation. Also, the motor housing may be made of blends of nylon material or thermoplastic polyester material. Such polymeric materials, which exhibit the characteritstic of thermal stability at normal operating temperatures of the motor when cooled by water as described herein, resistance to deformation and to breakage under impact and resistance to deterioration in water during normal use of the motor, may be used in the practice of the invention.

Figure 2:
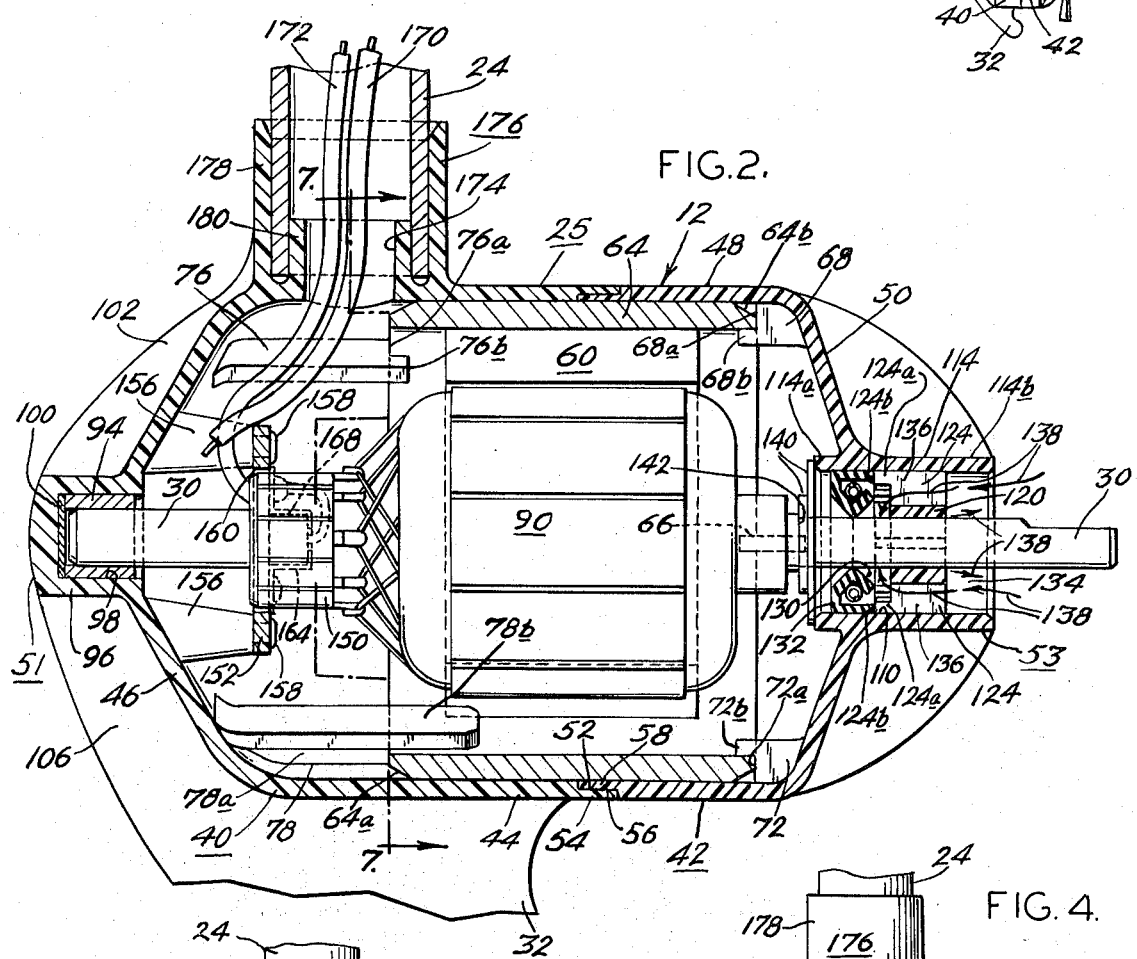
FIG. 2 is an enlarged fragmentary sectional view of the trolling motor with the propeller omitted similarly viewed as in FIG. 1.

Referring now to the specific embodiment of the invention illustrated in FIGS. 2–8, the watertight trolling motor housing 25 includes a front or first end section 40 and a back or second end section 42. The first and second end sections 40 and 42 are generally cup-shaped, front end section 40 having a generally cylindrical portion 44 and a gradually outwardly sloping end portion 46 for closing one end of cylindrical portion 44 and second end section 42 having a generally cylindrical portion 48 and a generally gradually outwardly sloping end portion 50. Both end portions 46 and 50 are provided with central axially extending portions 51 and 53, respectively, of reduced diameter for supporting the armature shaft, as will be explained more fully hereinafter. The diameters of cylindrical portions 44 and 48 of end sections 40 and 42, respectively, are generally the same, and the open ends of cylindrical portions 44 and 48 are adapted to fit together in an overlapping manner, as shown in FIG. 2. More specifically, cylindrical section 44 has an internal annular recess 52 under end lip 54 and cylindrical portion 48 has an external annular groove 56 around lip 58. In this arrangement, lip 54 of first end section 40 is received in recess 56 of second end section 42 and lip 58 of second end section 42 is received within groove 52 of end section 40 to have the lips 54 and 58 overlap each other to tightly close the opening between end sections 40 and 42.

With the lips 54 and 58 of end sections 40 and 42 fitted together in overlapping relation, the end sections may be joined together by any conventional means, such as cement or glue, ultrasonic welding, bonding together by heat, or chemically treating the plastic material to cause a melting of the lips 54 and 58 together. The overlapping lips of end sections 40 and 42 provide an adequate area for sealing the sections together to provide a watertight joint therebetween. By sealing the two sections of the housing together, conventional gaskets used between metal housing sections are avoided, thereby avoiding one of the main problem areas causing failure of trolling motors, that is, leakage of water into the housing at the gaskets. Also, by sealing the housing sections together, the use of conventional through bolts, which are typically employed to hold opposite end sections to a central section of metal housings, are avoided, thereby avoiding the provision of further openings in the housing through which the through bolts extend and which are areas where water leakage can occur to cause malfunction of the motor.

The electrical portion of the motor is supported in the motor housing and includes permanent magnet flux generating means comprising two permanent magnets 60 and 62, which are arcuate in form as shown in FIGS. 7 and 8 and are symmetrically spaced around walls of a cylindrical member 64 of magnetic material and conform to the shape of the walls of cylindrical member 64, as shown in FIGS. 7 and 8. The permanent magnets 60 and 62 are spaced equal distances from the open ends of cylindrical member 64. The cylindrical member 64 provides a flux return path for the magnets, which are face polarized to provide poles of opposite polarity around the cylindrical member. The outside diameter of cylindrical member 64 is slightly less than the inside diameter of cylindrical portions 44 and 48 of first and second end sections 40 and 42, respectively, and is adapted to be positioned within the cylindrical portions 44 and 48 of first and second end sections 40 and 42, respectively, as shown in FIGS. 2 and 7.

Each of end sections 40 and 42 is provided with positioning means for aligning and positioning the cylindrical flux return member 64 and magnets 60 and 62 in end sections 40 and 42 of the motor housing. More specifically, the positioning means in second end section 42 is provided by four spaced projections of ribs 66, 68, 70 and 72, which are symmetrically spaced around the inside of end section 42 and are integral with the end section, as shown in FIGS. 2, 6 and 8. Ribs 66, 68, 70 and 72 extend axially from end portion 50 to within the cylindrical portion 48 of second end section 42 and are each provided with an undercut or recessed area 66a, 68a, 70a and 72a, respectively, adjacent the inside diameter of the cylindrical portion 48 to receive one end of cylindrical flux return member 64 and provide shoulders against which one end of cylindrical flux return member 64 abuts. Particularly, recesses 66a, 68a, 70a and 72a of ribs 66, 68, 70 and 72, respectively, are adapted to receive one end of cylindrical flux return member 64 such that projections 66b, 68b, 70b and 72b extend into the inside of cylindrical flux return member 64. In order to facilitate easy fitting of cylindrical flux return member 64 into the end sections, the outside peripheral ends of member 64 have beveled surfaces 64a and 64b, as shown in FIGS. 2 and 8.

As described in regard to the second end section, the positioning means in first end section 40 for positioning cylindrical flux return member 64 and magnets within the end section is provided by four spaced projections or ribs 74, 76 78 and 80, which are spaced around the inside of the first end section and are integral with the end section, as shown in FIGS. 2, 5 and 8. Ribs 74, 76, 78 and 80 extend from end wall 46 to within the cylindrical portion 44 of end section 40 and are spaced such that two ribs 74 and 76 are in the upper portion of end section 40 and two ribs 78 and 80 are in the lower portion of end section 40. Ribs 74, 76 and 80, but not rib 78 which will be described hereinafter, are of generally the same configuration as ribs 66, 68, 70 and 72 of the second end section, except that the ribs 74, 76 and 80 extend a greater axial distance from end portion 46 into cylindrical portion 44 to allow for electrical connections to the motor structure, as shown in FIG. 2. Particularly, ribs 74, 76 and 80 have undercut or recessed areas 74a, 76a, and 80a, respectively, adjacent the inside diameter of cylindrical portion 44 to receive the other end of cylindrical flux return member 64 and provide shoulders against which the end of cylindrical flux return member 64 abuts with projections 74b, 76b and 80b extending into the inside of member 64, as shown in FIGS. 2, and 7.

The large projection or rib 78 in first end section 40 not only positions the flux return member 64 but also provides alignment means for aligning permanent magnets 60 and 62 to give the optimum angular positional relationship between the magnet poles and other electrical components of the motor, such as the electrical brushes contacting the armature commutator section, as will be described hereinafter. Specifically, the rib 78 extends axially from end portion 46 to within cylindrical portion 44 of end section 40 and is generally T-shaped in cross section over part of its length, as shown in FIGS. 5, 7 and 8. Projection or rib 78 has a rib portion 78a which extends into the cylindrical portion 44 to provide a shoulder at its end against which the end of cylindrical flux return member 64 abuts and a tongue or elongated axial projection 78b providing the top of the T-shape supported on the rib portion 78a. The tongue 78 extends generally parallel to the inside diameter of the cylindrical portion 44 and is arcuate in cross section to be concentric with the inside diameter of cylindrical portion 44 of first end section 40.

The tongue 78b extends a distance past the end of rib 78a into cylindrical portion 44 to project inside cylindrical flux return member 64 adjacent its inner surface. Particularly, the flux return member 64 is adapted to fit between the free end of tongue 78b and the inside diameter of cylindrical portion 44 and, in this arrangement, the free or suspended end of tongue 78b is adapted to pass between adjacent ends of magnets 60 and 62 in order to properly position magnets 60 and 62 with respect to the electrical brushes of the motor. As best seen in FIG. 2, when the end sections 40 and 42 of motor housing 25 are assembled together in overlapping relation with the cylindrical flux return member 64 with magnets 60 and 62 inside the housing, cylindrical flux return member 64 extends within both cylindrical portions 44 and 48 of end sections 40 and 42, respectively, to abut against ribs 66, 68, 70 and 72 of end section 42 and ribs 74, 76, 78 and 80 of end section 40. The tongue 78b must pass between the ends of arcuate shaped magnets 60 and 62 before flux return member 64 with magnets 60 and 62 therein can be positioned in end section 40, as shown in FIG. 2, thereby aligning the angular positional relationship of the magnets within the housing.

Figure 3:
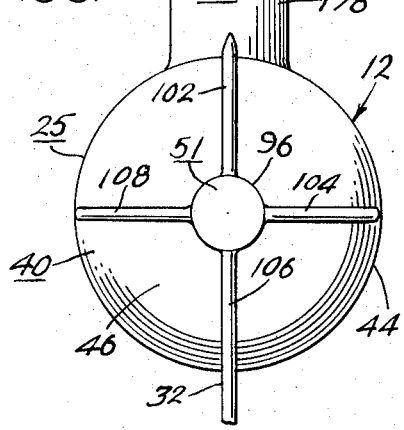
FIG. 3 is a front end elevational view of the trolling motor of FIG. 2 on a reduced scale.

There is also contained within motor housing 25 an armature assembly, generally designated 90, which is journalled in end sections 40 and 42. The shaft 30 of armature 90 is received at one end in bearing member 94 within a recess 98 in axially extending portion 51 of front end section 40. More specifically, front end section 40 is provided with an outwardly projecting boss or axial portion 96 of reduced outside diameter formed in the center of the outwardly sloping end portion 46, as shown in FIGS. 2, 3 and 8. The boss of axial portion 96 is provided with internal recess 98, which has bearing 94 pressfitted therein to rotatably support one end of shaft 30. The end of shaft 30 within bearing 94 abuts against thrust washer 100 at the axial closed end of recess 98. The axial portion 96 projects outwardly from the center of end portion 46 of front end section 40 in order to provide good heat transfer between the bearing member supported therein and the water. By supporting bearing 94 in an outwardly projecting axial portion 96, the polymeric material of the end section 40 is not deformed by the heat generated by operation of the motor turning shaft 30 within bearing member 94, since this configuration advantageously provides good thermal conduction to the water surrounding the outwardly projecting axial portion 96. For example, as previously mentioned, the temperature in the motor housing may be on the order of 220°F. to 250°F. and the temperature at bearing member 96 may be approximately 270°F. within axial portion 96. Thus, the configuration of the axial portion 96 is such that heat is conducted therethrough to the surrounding water preventing deformation of the polymeric material forming end section 40.

In order to strengthen the housing at axial portion 96, four symmetrically spaced reinforcing ribs 102, 104, 106 and 108 are provided extending from the outside periphery of the cylindrical portion 44 to the outer end of axial portion 96 of the first end section 40, as shown in FIGS. 2, 3 and 8. The reinforcing ribs may be integral with front end section 40 and the bottom reinforcing rib 106 may be a continuation of rudder 32, as shown most clearly in FIGS. 1, 2 and 3. The axial end of axial portion 96 and the outside periphery of associated ribs 102, 104, 106, and 108 generally are outwardly curved in an arcuate form to reduce turbulence of water as the trolling motor proceeds through the water.

The other end of shaft 30 extends through central opening 110 in axially extending portion 53 in end portion 50 of back end section 42. The end of shaft 30 extending through opening 110 in axially extending portion 53 is adapted to have propeller 28 pinned thereto. Specifically, axially extending portion 53 of the back end section 42 includes a tubular portion 114 having an internal axial cylindrical portion 114a and a continuous external axial cylindrical portion 114b supported by and integral with end portion 50 of back end section 42, as shown most clearly in FIGS. 2 and 8. The axially extending portion 53 further includes an annular portion or member 120 supported in the opening within tubular portion 114, the annular member 120 being cylindrical in form and extending an axial distance less than tubular portion 114. Annular member 120 is supported in the central part of tubular portion 114 by a plurality of radially extending members or ribs, each designated 124, between tubular portion 114 and annular member 120, as shown in FIGS. 2, 4, 6 and 8. The annular member 120 and ribs 124 are formed integral with tubular portion 114 and back end section 42. In this arrangement, annular member 120 directly supports the end of shaft 30, which extends through the central opening in the annular member, the annular member providing a bearing within which shaft 30 rotates. Radial ribs 124 extend the same axial distance as annular member 120 but are each provided with a reduced radial thickness step 124a adjacent the inside of tubular portion 114 and extending axially toward the inside of the housing along the inside diameter of tubular portion 114. The steps 124a provide shoulders 124b and define a reduced diameter annular chamber 130 between steps 124 and shaft 30 just beyond the internal axial end of annular member 120. An annular sealing member or ring 132 is press fitted within tubular portion 114 to abut against shoulders 124b of ribs 124 to provide a watertight seal between tubular portion 114 and shaft 30, as shown in FIG. 2.

Figure 4:
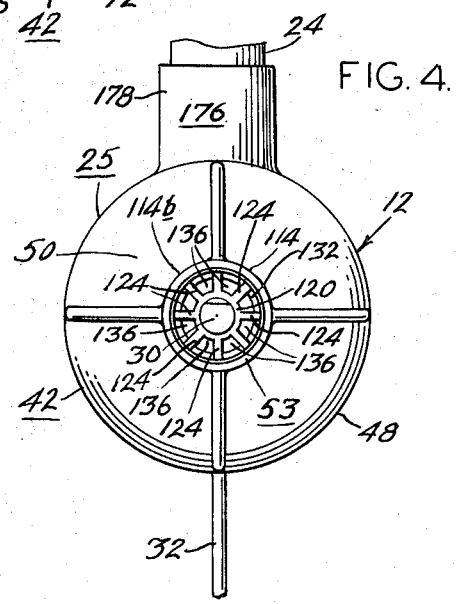
FIG. 4 is a back end elevational view of the trolling motor of FIG. 2 on a reduced scale.

As shown in FIGS. 2, 4 and 8, in an arrangement similar to that described relative to the front end section, the back end section 42 is provided with four symmetrically spaced reinforcing ribs 131, 133, 135 and 137 extending from the outside periphery of the cylindrical portion 48 to the outer end of axial cylindrical portion 114b in order to strengthen the housing at axial portion 114b. The reinforcing ribs are shown integral with back end section 42 and have their outer peripheries generally outwardly curved in an arcuate form to reduce turbulence of water as the trolling motor proceeds through the water.

When the trolling motor is immersed in water and operating, the bearing surface of annular member 120 in which shaft 30 rotates is lubricated and cooled by the water to dissipate heat generated therebetween sufficiently to prevent deformation of back end section 42 and particularly annular bearing member 120. More specifically, as shaft 30 rotates, water from outside the housing may enter within the tubular portion 114 at annular chamber 134, pass through the eight passages, each designated 136, between the eight ribs 124, and is permitted to flow into inner annular chamber 130 around shaft 30 beyond the internal axial end of annular bearing member 120, as indicated by the arrows 138 representing water flowing around annular bearing member 120 in FIG. 2. The water flowing into inner annular chamber 130 then may pass between shaft 30 and the inside diameter of circular bearing member 120 back to outer annular chamber 134 and the outside of the housing, as indicated by arrows 138 representing water flow. By this arrangement of water cooling the bearing surface of annular bearing member 120, a separate conventional metal bearing or bushing member is eliminated and a much more economical motor housing of plastic material is feasible. Furthermore, when directly supporting shaft 30 by annular bearing member 120 as shown in FIG. 2, the temperature of annular bearing member 120 during operation of the motor has been found to be only a few degrees higher than the temperature of the water in which the trolling motor is operated. Thus, the temperature at bearing member 120 of back end section 42 is substantially lower than the temperature at bearing member 94 in front end section 40, the latter temperature being on the order of 270°F. The back end section in accordance with this form of the invention does not require a number of separate metal parts to provide the bearing and support therefor and may be made of a one-piece molded plastic configuration, as shown in FIGS. 2, 4, 6 and 8.

While the exact thickness of the polymeric material forming the first and second end sections is not critical, it is desirable that the walls be of a thickness to provide suitable impact strength as well as good heat transfer characteristics, which in most instances makes it desirable to keep the material forming the walls as thin as possible. Also, the impact strength of many plastics decreases after a certain thickness of material is reached and no additional advantageous characteristics are provided with increased thickness. According to the present invention, it has been found desirable to employ a thickness of material for the walls in a range from about 40 thousandths of an inch to about 150 thousandths of an inch, while it is considered preferably for optimum properties enumerated above and heat transfer characteristics to employ a thickness of material of approximately 80 thousandths of an inch in the walls of the housing.

As shown in FIG. 2, several washers, generally designated 140, of different diameters surround shaft 30 between a shoulder 142 on shaft 30 and the internal open end of tubular portion 114 of back end section 42. The armature assembly 90 is of a conventional type comprising a stacked plurality of thin laminations of magnetic material with windings wound thereon, the windings being coupled to commutator means or segments, generally designated 150, supported on the armature shaft.

As shown in FIGS. 2 and 5, an insulating board, generally designated 152, is fixed to the interior of front end section 40 by four axial projections, each designated 156 which have reduced diameter portions 158 adjacent their ends. The reduced diameter portions 158 of projections 156 extend through openings in insulating board 152 and are deformed, as by heating, to secure the board firmly to projections 156, as shown in FIGS. 2 and 5. The insulating board 152 has a central opening 160 large enough to accommodate armature shaft 30 and the commutator means or section 150. The insulating board 152 supports brush holders 162 and 164, which supports spring biased brushes 166 and 168, respectively, adapted to contact and ride over the appropriate commutator segments of commutator means or section 150. The brushes may be formed of a conventional material, such as carbon or a sintered copper-lead-graphite mixture.

Electrical current is conducted from the control switch 18 to the armature 90 by electrical means shown most clearly in FIGS. 2 and 5. More specifically, the electrical means comprises electrical lines 170 and 172 which are located in and conducted through the water in watertight conduit means or pipe 24. The electrical lines pass into the motor housing through an opening 174 in a sidewall of cylindrical portion 44 of front end section 40. There is formed in the cylindrical portion 44 around opening 174 a fitting, generally designated 176, which is an integral part of the front end section 42 and is provided by an outer extended cylindrical member 178 and an inner foreshortened cylindrical member 180, the concentric cylindrical members 178 and 180 being spaced apart a distance slightly more than the thickness of the walls of conduit means 24. In this arrangement, conduit means 24 is press fitted between the inner surface of cylindrical member 178 and the outer surface of cylindrical member 180, and may be fixed in position by any suitable means, such as glue, to provide a watertight seal between the motor housing and conduit. Electrical line 170 is connected directly to brush 166, and electrical line 172 is connected directly to brush 168, as shown in FIG. 5. The electrical lines and brushes connect the armature directly to the source of voltage 14 through switch 18.

The motor shown and described in FIG. 2 operates in a conventional manner with direct current being supplied from source of voltage 14 to the armature through the electrical lines. When the motor is operating, water circulates around annular bearing member 120, as schematically illustrated in FIG. 2.

FIGS. 9 through 12 illustrate an alternative form for the rear end section of the motor housing. In the modification of FIGS. 9–12, parts similar to those in the structure of FIGS. 1–8 are identified by the same number designator with the addition of primes thereto. The primary difference lies in the use of a bearing member in the axially extending portion to support the shaft, rather than having the housing directly support the shaft. In this arrangement, axially extending portion 53' in end portion 50' of back end section 42' includes a first tubular portion 200 extending outwardly from end portion 50' and a second tubular portion 202 of reduced diameter extending inwardly into the end section 42'. The outward tubular portion 200 has a cylindrical opening 204, which is adapted to receive a hub of propeller 28 (not shown) to prevent weeds, line and the like from becoming caught on shaft 30', and a reduced diameter cylindrical opening 206 adapted to have annular sealing member or ring 207 press fitted therein. Four symmetrically spaced ribs, each designated 208, extend from inside tubular portion 200 into opening 206 at the inner axial end of cylindrical opening 206, the ribs provide a surface against which sealing ring 207 abuts to position the sealing ring in tubular portion 200 around shaft 30'.

The shaft 30' is supported in inner tubular portion 202, which is annular in form and receives bearing member 210. Bearing member 210 is press fitted within annular member or portion 202 and abuts against ribs 208 to position the bearing member in the proper axial relationship. Preferably, bearing member 210 is provided by a bronze bushing which is impregnated with lubricant to be self-lubricated with oil. Inner annular tubular portion 202, which supports the bearing member and shaft, is strengthened by four symmetrically spaced ribs, each designated 212, provided between the outside periphery of tubular portion 202 and the inside surface of end portion 50', as shown in FIGS. 9, 11 and 12.

The temperature at bearing member 210 is not as hot as the temperature at the front bearing member, since rear bearing member 210 is further removed from the commutator section, which generates substantial heat, and shaft 30' extends into the cooling water near bearing member 210 to conduct heat from the bearing member to the water. In this arrangement, it has been found that the temperature at bearing member 210 is approximately 100°F. to 110°F. The configuration shown in FIGS. 9–12 for the back end section is such that heat is controlled around the inner annular portion sufficiently to prevent deformation of the polymeric material forming the back end section of which the tubular portions are an integral part.

It will be observed by those skilled in the art that the trolling motor housing arrangements employed in the present invention provide a simple and very inexpensive motor assembly. The trolling motor housing of polymeric material with the specific characteristics mentioned above has been designed to prevent deformation or destruction of the housing due to heat generated by operation of the motor. Particularly, the bearing arrangements at the front and back of the motor housing provide good heat transfer relationship for dissipating sufficient heat to prevent deformation of the housing. The water lubricated bearing arrangement used in the embodiment of FIG. 2 at the back of the housing may also be employed for the front bearing, if desired.

The present motor housing can be made in such an inexpensive manner that the two sections of the housing are sealed together and the motor is not adapted to be disassembled for repair. If the motor malfunctions, the motor housing structure is merely discarded with lines 170 and 172 and a new motor structure is connected to the lower end of conduit 24 with the electrical lines associated with the motor brushes being threaded through the conduit and connected to switch 18. Even though the present trolling motor structure is inexpensive, it has been designed for trouble-free operation. The present construction eliminates gaskets between housing sections and other openings normally provided for bolts, thereby eliminating areas where water leakage can occur which is the main cause of motor malfunction. Moreover, the present trolling motor is light in weight so that it is easy to handle and there is no problem with paint chipping or deteriorating in the water, since the color is molded into the polymeric material of the housing. The motor housing of polymeric material is corrosive resistant and only the shaft is subject to corrosion, the shaft being made of stainless steel to resist corrosion.

While the present invention has been described with particular reference to specific embodiments thereof, it will be understood that it may be embodied in a large variety of forms diverse from the ones specifically shown and described without departing from the scope and spirit of the invention as defined in the appended claims.

We claim:

1. A trolling motor adapted for operation immersed in water, comprising:

means encircling watertight motor including at least a first end section and a second end section of polymeric material, the sections of the housing being held together to form a watertight seal therebetween;

flux generating means supported by the motor housing;

an armature assembly having a shaft rotatably supported by the motor housing;

the first end section having a closed end and the second end section having an end opening for receiving one end of the armature shaft through the opening, the first end section and the second end section having axially extending portions of reduced diameter and the ends of the shaft being rotatably supported within the axially extending portions in a manner to control heat generated by rotation of the armature assembly to prevent deformation of the housing; the polymeric material being characterized by its thermal stability at normal operating temperatures of the motor when cooled by water in a predetermined manner, its resistance to permanent deformation and to breakage under impact, and its resistance to deterioration by water during normal use of the motor; the opening in the second end section receiving the one end of the armature shaft being cylindrical in form and through the axially extending portion to provide a bearing directly supporting the end of the shaft;

the second end section having passage means including a plurality of passages for water communicating with outside the second end section and extending into the second end section to communicate with the shaft; and sealing means encircling the shaft and supported by the second end section at the inner side of the axially extending portion to prevent water from entering into the motor housing; the plurality of passages for water extending into the second end section between the sealing means and the axially extending portion to circulate water between the shaft and axially extending portion to dissipate heat generated between the axially extending portion and the shaft sufficiently to prevent deformation of the second end section.

2. The trolling motor of claim 1 in which walls of the motor housing have a thickness in the range from about 40 to about 150 thousandths of an inch.

3. A trolling motor adapted for operation immersed in water, comprising:

a watertight motor housing including at least a first end section and a second end section of polymeric material, the sections of the housing being held together to form a watertight seal therebetween;

flux generating means supported by the motor housing;

an armature assembly having a shaft rotatably supported by the motor housing;

the first end section having a closed end and the second end section having an end opening for receiving one end of the armature shaft through the opening, the first end section and second end section having axially extending portions of reduced diameter and the ends of the shaft being rotatably supported within the axially extending portions in a manner to control heat generated by rotation of the armature assembly to prevent deformation of the housing; the polymeric material being chracterized by its thermal stability at normal operating temperatures of the motor when cooled by water in a predetermined manner, its resistance to permanent deformation and to breakage under impact, and its resistance to deterioration by water during normal use of the motor;

the axially extending portion of the second end section having a tubular portion through which the shaft extends and an annular portion supported in the tubular portion by a plurality of members between the tubular portion and annular portion, the annular portion encirculating the shaft and providing a bearing directly supporting the shaft;

sealing means encirculating the shaft and supported by the tubular portion on the inside of the housing from the annular portion; and passage means provided between the tubular portion and the annular portion and between the sealing means and annular portion for circulating water from outside the housing around the annular portion and between the annular portion and the shaft.

4. A trolling motor adapted for operation immersed in water, comprising:

a watertight motor housing including at least a first end section and a second end section of polymeric material, the sections of the motor housing being held together to form a watertight seal therebetween;

flux generating means supported by the motor housing;

an armature assembly having a shaft rotatably supported by the motor housing;

the first end section having a closed end and the second end section having an end opening for receiving one end of the armature shaft through the opening, the first end section and second end section having axially extending portions of reduced diameter and the ends of the shaft being rotatably supported within the axially extending portions in a manner to control heat generated by rotation of the armature assembly to prevent deformation of the housing; the polymeric material being characterized by its thermal stability at normal operating temperatures of the motor when cooled by water in a predetermined manner, its resistance to permanent deformation and to breakage under impact, and its resistance to deterioration by water during normal use of the motor;

the first end section including a cylindrical portion and a gradually outwardly sloping end portion, the axially extending portion of the first end section extending outwardly from the end portion and having reduced diameter from the cylindrical portion, the axially extending portion having an internal recess opening into the housing, the first end section including a plurality of reinforcing ribs extending from the outside periphery of the cylindrical portion to the axially extending portion; and a bearing member supported in the recess of the axially extending portion of the first end section, the bearing member rotatably supporting one end of the shaft.

5. The trolling motor of claim 4 further comprising a second bearing member supported by the axially extending portion of the second end section and rotatably receiving one end of the armature shaft, whereby heat generated by operation of the motor is dissipated through the motor housing and armature shaft to the water.

6. The trolling motor of claim 5 in which the armature assembly includes a commutator section supported in the first end section, and the second bearing member is impregnated with oil to control heat generated in the second end section.

7. The trolling motor of claim 4 in which walls of the motor housing have a thickness in the range of about 40 to about 150 thousandths of an inch.

8. A trolling motor adapted for operation immersed in water, comprising:

a watertight motor housing including at least a first end section and a second end section of polymeric material, the sections of the motor housing being held together to form a watertight seal therebetween;

flux generating means supported by the motor housing;

an armature assembly having a shaft rotatably supported by the motor housing;

the first end section having a closed end and the second end section having an end opening for receiving one end of the armature shaft through the opening, the first end section and second end section having axially extending portions of reduced diameter and the ends of the shaft being rotatably supported within the axially extending portions in a manner to control heat generated by rotation of the armature assembly to prevent deformation of the housing; the polymeric material being characterized by its thermal stability at normal operating temperatures of the motor when cooled by water in a predetermined manner, its resistance to permanent deformation and to breakage under impact, and its resistance to deterioration by water during normal use of the motor;

the first end section including a cylindrical portion and a gradually outwardly sloping end portion, the axially extending portion of the first end section extending outwardly from the end portion and having a reduced diameter from the cylindrical portion, the axially extending portion having an internal recess opening into the housing;

a first bearing member supported in the recess of the axially extending portion of the first end section, the first bearing member rotatably supporting one end of the shaft; and a second bearing member supported by the axially extending portion of the second end section and rotatably supporting one end of the armature shaft; whereby heat generated by operation of the motor is dissipated through the motor housing and armature shaft to the water; the motor housing having walls of a thickness in the range from about 40 to about 150 thousandths of an inch.

* * * * *

UNITED STATES PATENT OFFICE
CERTIFICATE OF CORRECTION

Patent No. 3,814,961     Dated June 4, 1974

Inventor(s) Isaac H. Nelson and Heyward T. Spinks

It is certified that error appears in the above-identified patent and that said Letters Patent are hereby corrected as shown below:

Column 12, line 37, before "watertight" delete "means encircling" and insert --a--; line 37, after "motor" insert --housing--.
      Column 13, line 4, "meansencircling" should be --means encircling--; line 38, "chracter-" should be --character- --.

Signed and sealed this 12th day of November 1974.

(SEAL)
Attest:

McCOY M. GIBSON JR.              C. MARSHALL DANN
Attesting Officer                Commissioner of Patents